US006360369B1

(12) United States Patent
Mahoney (10) Patent No.: US 6,360,369 B1
(45) Date of Patent: Mar. 19, 2002

(54) INTERFERENCE TOLERANT MODEM (76) Inventor: Paul F. Mahoney, 21 Burr Rd., Hull, MA (US) 02043

( * ) Notice: Subject to any disclaimer, the term of this patent is extended or adjusted under 35 U.S.C. 154(b) by 0 days.

(21) Appl. No.: 09/252,343

(22) Filed: Feb. 18, 1999

Related U.S. Application Data
(60) Provisional application No. 60/075,062, filed on Feb. 18, 1998.

(51) Int. Cl.[7] .......................... H04N 7/173; H03H 7/30; H03H 7/40; H03K 5/159; H04B 1/10
(52) U.S. Cl. ...................... 725/111; 725/125; 375/232; 375/350
(58) Field of Search ................................ 375/222, 232, 375/348, 346, 350; 425/125, 111

(56) References Cited

U.S. PATENT DOCUMENTS 5,646,935 A * 7/1997 Ishikawa et al. ............ 370/207
6,002,713 A * 12/1999 Goldstein et al. ........... 375/222
6,047,022 A * 4/2000 Reuven ...................... 375/222

OTHER PUBLICATIONS

Defata et al. "Digital Signal Processing: A System Design Approach", John Wiley and Sons, Inc., 1988, pp. 264–269, 311–313.

* cited by examiner

Primary Examiner—Andrew Faile
Assistant Examiner—Andrew Y. Koenig
(74) Attorney, Agent, or Firm—D. Michael Burns (57) ABSTRACT A system for the removing of interference (ingress) in cable modems without reducing the data rate or changing the frequency of the signal. The invention comprises both, a variable band stop filter bank, and a non-linear equalization system. The band stop filter bank removes ingress while the equalization system, comprising of an inner and an outer equalizer, removes the distortion created by the band stop filtering. A spectrum monitor detects both the presence of ingress and its frequency, then feeds the data to a digital signal processor which calculates the distortion removal settings for the equalizers. No additional hardware of software is required in the users homes, but rather the invention is designed to be used solely at the head end and in addition to the basic Cable Modem Termination System.

10 Claims, 6 Drawing Sheets

INTERFERENCE TOLERANT MODEM

CROSS REFERENCE TO RELATED APPLICATION

This application is based on Provisional Patent Application Serial No. 60/075,062, filed Feb. 18, 1998.

BACKGROUND OF THE INVENTION

1. Field of the Invention

The present invention relates to a CATV cable modem for receiving digital data transmitted over a cable television network, and more specifically pertains to a serial tone data transmission in the presence of unwanted interference.

2. Description of the Prior Art

It is well known that cable networks are being used for data and telephone services while continuing to supply cable TV service. Usually these systems are Hybrid Fiber Coaxial (HFC) systems. HFC systems utilize fiber optic cable to deliver the broadcast signals to a residential neighborhood from the head end. The signals are distributed throughout the neighborhood by means of coaxial cable. This arrangement is used because although fiber optic cable has a very high capacity and is virtually distortion free, it is more expensive and requires more expensive modulators and demodulators. Although coaxial cable has a lower capacity and generally introduces more distortion, it is less costly and is already in place throughout most of Europe and North America. These cable systems comprise a head end, fiber optic transmitters and receivers, fiber, cable, RF amplifiers, taps and drop cables. Early cable systems were designed for only one direction, that being from the head end to the home. Systems today are designed to handle data transmission in both directions. Typically, the cable is made bi-directional by using frequencies from 50 MHz to 550 MHz (or higher) for the downstream transmission, which is towards the home, while frequencies from 5 MHz to 42 MHz are used for the upstream transmission, which is from the home. To provide amplification in both directions, without oscillation, the amplifiers separate the upstream and downstream signals by filtering and then amplifying them separately. Earlier systems generally required upgrading for bi-directional transmission, and many systems were upgraded for upstream transmission of pay TV signals. However, the overall quality of the upstream path was not as good as it could be if the upgrade were designed for data transmission.

In handling data over cable systems, the cable network is shared with the conventional cable TV along with other traffic. When in the downstream direction, a portion of the downstream bandwidth is allocated for data traffic. The data band can be a contiguous band or it may be interspersed between the TV and other traffic. Typically, the downstream bandwidth is much greater than the upstream bandwidth. This works out well, since in most data applications, the amount of data flowing toward the end user is much greater than the amount of data flowing from the user. In a typical system, there would be many modems operating at once at different frequency bands, and each frequency band is also time shared among many modems, thereby allowing hundreds of users to be able to use the system simultaneously. In addition, the cable system is segmented into neighborhoods wherein each neighborhood will have its own fiber optic cable, so that the capacity of the system can be multiplied by the number of neighborhoods serviced.

Ingress is interference which is inadvertently coupled into the cable plant and it is a significant problem in cable systems. The upstream path is subject to more ingress that the downstream path. This is because the lower frequencies couple into the cable more easily than do the higher frequencies, and also because in the upstream direction all ingress is funneled back to the head end, whereas in the downstream direction, ingress only affects the portion of the system that is downstream from the point where the ingress enters. Ingress is more commonly found at frequencies below 15 MHz, although it can also be found at higher frequencies. Ingress is predominantly picked-up in the drop cable, which is the final connection to the house. Among the many sources of ingress are: HF radio broadcast transmissions, electromechanical devices, mobile radios, and CB radios. Ingress is usually concentrated at a few discrete frequencies.

Cable modems fall into two broad categories, parallel tone modems and serial tone modems. Parallel tone modems operate by dividing the band into many sub-bands and then sending data at a low rate through each sub-band. This technique is also known as Discrete Multi-Tone (DMT). This approach has the advantage in that, if any ingress is present in one or more sub-bands, just those sub-bands will be effected. Systems can then be designed that will detect the presence and location of ingress so that data can be sent to just the ingress-free part of the frequency band. However, since the power in each sub-band is much less than the total power, the ingress power required to interfere with a sub-band is much less. The parallel tone approach is more sensitive to ingress, but it does degrade gracefully and gives up just a small amount of data capacity to avoid the ingress. This approach is generally more expensive to implement than the serial tone approach, and does not work well in the presence of ingress that occurs at many parts of the frequency band.

Serial tone modems send one symbol at a time at a rate such that the signal occupies the entire bandwidth. There may be several modems operating at different frequencies at the same time, but each modem operates serially and independently of the others. Serial tone modems are more robust than the parallel tone modems, but once the ingress becomes large enough to interfer with the signal, all data transmission is degraded or lost. The most common type of modulation used in cable modems is Quadrature Amplitude Modulation (QAM). Usually, 16QAM or 4QAM is used for the upstream and 16QAM, 64QAM or 256QAM is used for the downstream. The cable industry has selected serial tone modems as the preferred method of providing over cable, a cable consortium called the Multimedia Cable Network Systems (MCNS) consortium has issued a specification (Data Over Cable Interface Specifications/Radio Frequency Interface Specification SP-RF1101-970326) for cable modems which will enable equipment from different manufacturers to interoperate. This specification calls for a serial tone modem using 4QAM and 16QAM for the upstream and 16QAM, 64QAM or 256 QAM for the downstream. The MCNS specification provides for three methods of combating ingress, these are: a) changing to to a more robust signal constellation, b) reducing the symbol rate, and c) changing the transmission frequency to a frequency where there isn't any ingress present. Changing the signal constellation, to a more robust one, reduces the data rate as does reducing the symbol rate. Changing the signal frequency to avoid ingress means that part of the band is unused, so the overall system throughout is reduced. Often it may be necessary to reduce the data rate in order to fit the signal into the available ingress-free bands. All combinations of these methods are called for in the MCNS specification. The present invention can be used with modems designed to meet the requirements of the MCNS specification as well as other serial tone modems.

SUMMARY OF THE INVENTION

The present invention provides a means of removing ingress in cable modems, without reducing the data rate or changing the frequency of the signal. Furthermore, the present invention is used at the head end only, and does not require any change in the hardware or software in residential modems. Since the number of head end modems is very small in comparison to the number of residential modems, the increase in the system cost is very low for what amounts to a substantial increase in system throughput and capacity. The present invention uses a variable band stop filter bank to remove ingress, and a non-linear equalization arrangement to compensate for the distortion introduced by the band stop filter bank. A spectrum monitor is used to detect the presence of ingress and its frequency. When ingress is detected, a band stop filter is formed. The band stop filter has a notch at the frequency of the ingress. The equalizer is set to make compensation for the distortion which is introduced by the band stop filter. The band stop filter may have a multiplicity of notches to eliminate ingress at a multiplicity of frequencies. If the band stop filter were implemented using a conventional FIR approach, the number of taps required would be excessive. Two ways of overcoming this problem are the fast convolution approach and the time mutiplexed polyphase filter approach. With todays technologies the fast convolution approach lends to the most efficient implementation. The equalizer removes the distortion introduced by the band stop filter. The equalizer consists of an inner equalizer and an outer equalizer. In some applications the inner equalizer alone may provide adequate performance. When ingress is detected by the spectrum monitor, a microprocessor or Digital Signal Process (DSP) is used to calculate the optimum equalizer settings.

Accordingly, it is a principal object of the invention to provide a means of removing ingress in cable modems without reducing the data rate or changing the frequency of the signal.

It is another object of the invention to be used only at the head end, thereby eliminating any need for hardware or software in the home.

It is a further object of the invention to provide a method of detecting the presence of ingress and removing the same.

It is an object of the invention to utilize a variable band stop filter bank to remove ingress and a non-linear equalization arrangement to compensate for the distortion introduced by the band stop filter bank.

It is an another object of this invention to remove ingress in digital radio communications.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to a method of substantially reducing the ingress picked up in the upstream path of a cable system. The invention is used at the cable head end only, and thereby eliminates the need for equipment at the residential homesite. In the preferred embodiment, the invention is designed to be incorporated into the system that operates with modems which are designed to be compliant with the Multimedia Cable Network Systems (MCNS) specification, or other similar systems.

Figure 1:
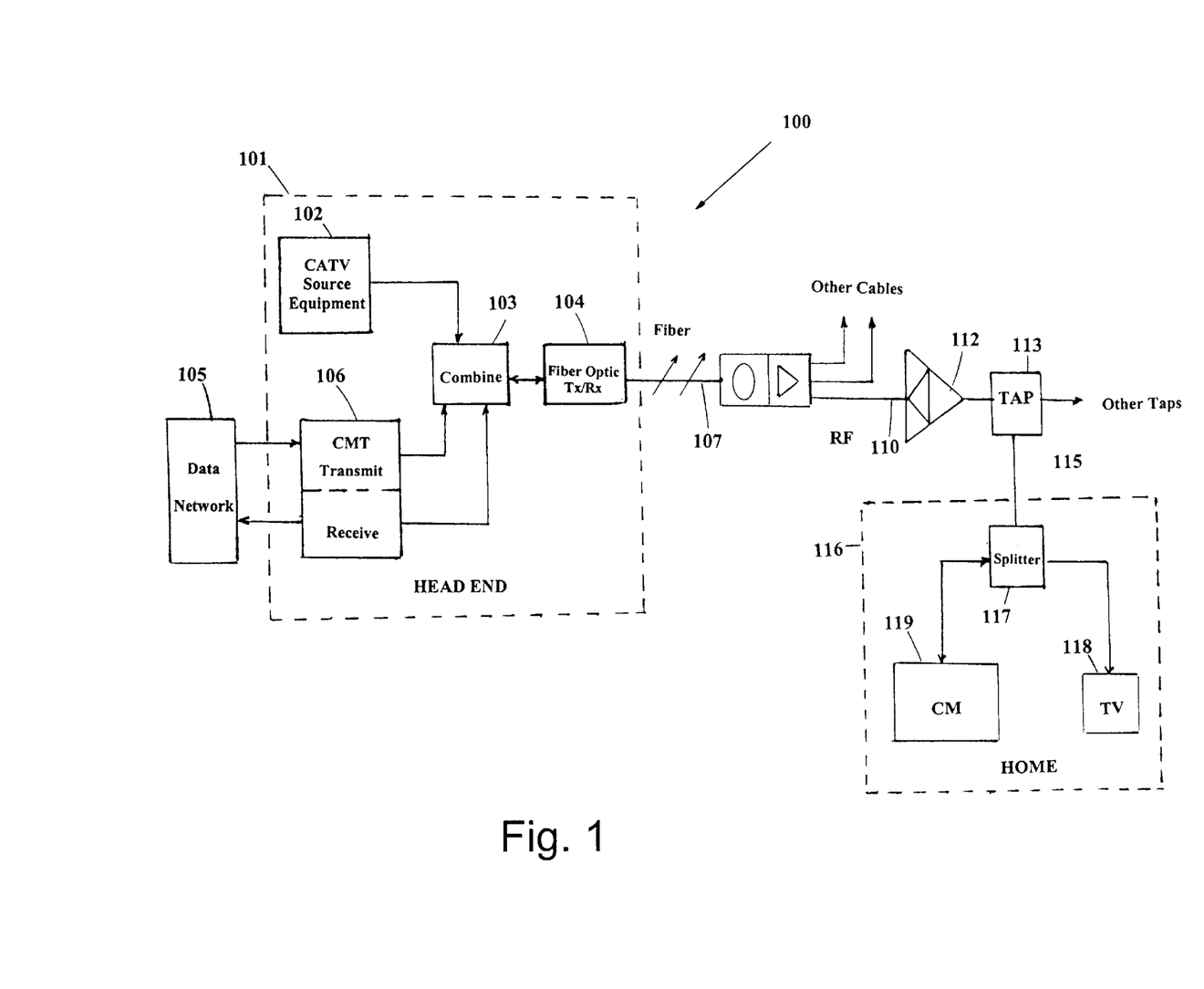
FIG. 1 is a block diagram of the overall basic Hybrid Fiber Coaxial System.

Referring first to FIG. 1, the Hybrid Fiber Coaxial (HFC) 100 is depicted. The block 101 is the head end. The head end 101 is the source of local CATV programing and would normally have antennas for receiving off-air and satellite TV receive only (TVRO) signals. The Data Network 105 represents a connection to the Internet, a digital telephone network connection or another type of data network. The data is transmitted through the cable system by digital modems. The digital modem in the head end is called the Cable Modem Termination (CMT) 106. Normally the head end 101 would contain multible CMTs 106, each of which is capable of communicating with several remote users at once. The output of the transmit section of the CMT 106 are combined 103 with signals from the CATV source 102 and then sent through the Fiber Optic Tx/Rx 104 and then onto the Fiber 107. At the remote end, the signal is converted to RF and passed through the cable system which includes a trunk cable 110, amplifiers 112, taps 113, and the drop cable 115. The amplifiers 112 are two way devices. The drop cable 115 connects to the home 116. Within the home 116, the signal is passed through the splitter 117 which separates the signal from the CATV source 102 from the transmitted data signal of the CMT 106. The modem in the home 116 is called the Cable Modem (CM) 119, which has a cooperating relationship with the home TV set 118. Most ingress is picked up in these drop cables 115. The present invention is in the receive section of the CMT 106 at the head set.

The signal received from the cable system is typically in the range of 5 Mhz to 42 Mhz, the spacing between channels is typically 3.2 Mhz when operating at the highest symbol rate. The upstream symbol rates are 2.56 Ms/S, 1.28 Ms/S, 640 Ks/S, 320 Ks/S and 160 Ks/S. The modulation is either 16 QAM or QPSK. The data rate in bits per second is equal to four times the symbol rate for 16 QAM and two times the symbol rate for QPSK. The lower symbol rates are used when the channel conditions are such that the higher symbol rates cannot be used. The present invention provides a means of effectively improving the channel conditions, whereby the higher data rates are more likely to be used with the present invention. The pulse shaping is 25% square root raised cosine (SRRC) shaping. This type pulse shaping limits the bandwidth of the signal to 1.25 times the symbol rate. In normal use the system is operated in a configuration of where many cable modems 119 communicate with just one head end modem 101. The head end modem currently used in the industry is called the Cable Modem Termination System (CMTS). The present invention is in addition to the Cable Modem Termination System (CMTS).

Figure 2:
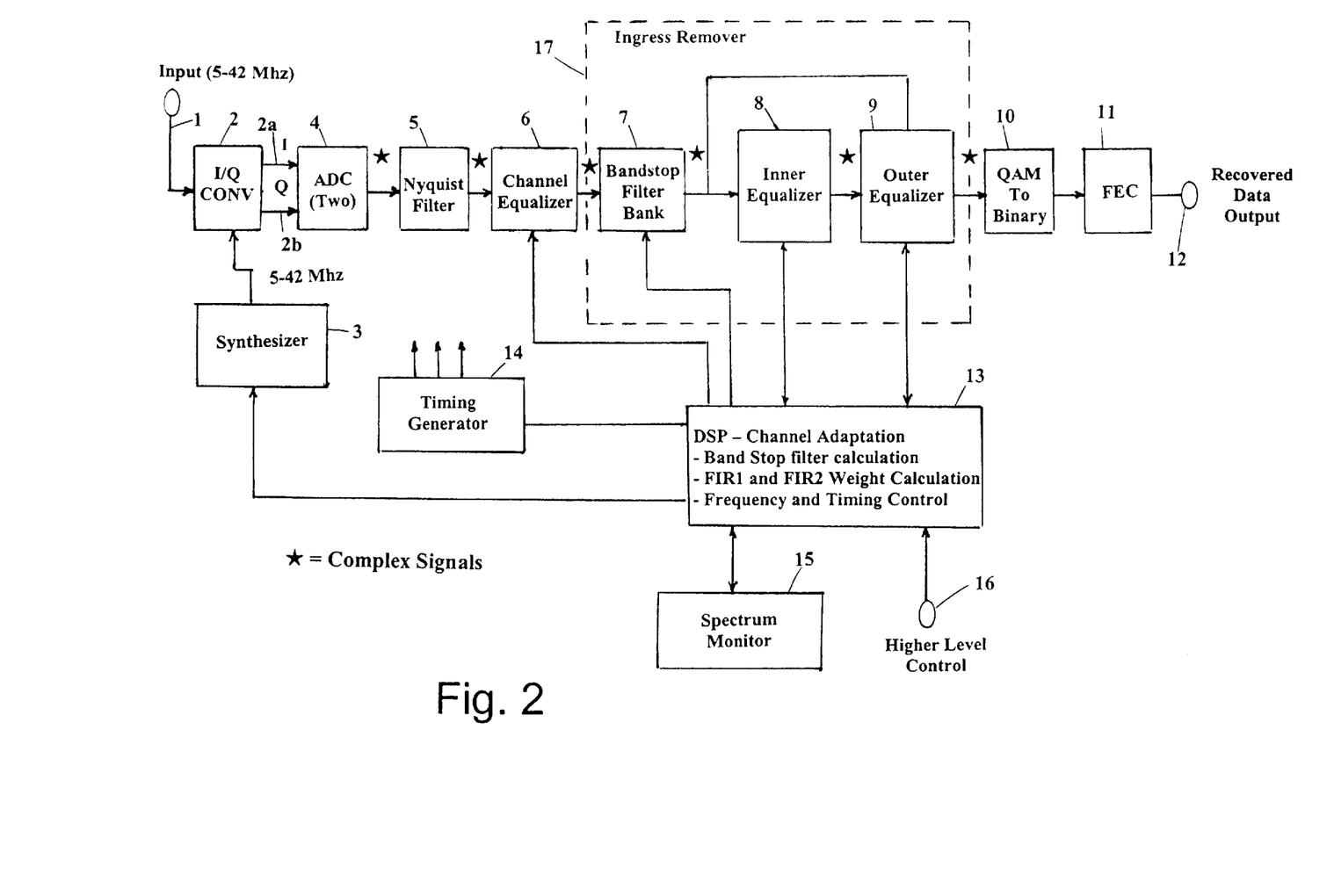
FIG. 2 is a block diagram of a conventional serial tone cable modem modified to include the present invention.

FIG. 2 shows a CMTS modem modified to include the present invention. The received signal 201 is converted to baseband inphase (I) 202a and quadrature components (Q) 202b by an I/Q demodulator 200. The I/Q demodulator 202 receives its local oscillator input from the synthesizer 203. The synthesizer 203 is set to the center frequency of the band being used. The baseline in-phase 202a and the quadrature components 202b are passed through a pair of analog to digital converters (ADCs) 404. The sample rate of the ADCs is typically twice the symbol rate. The outputs of the ADCs form a sequence of complex samples. These samples are passed through a Nyquist filter 205 for the MCNS, which in this case is a 25% square root raised cosine filter that is matched to the transmit filter. A Nyquist filter is a filter that shapes the frequency spectrum to control out of band emissions without introducing inter symbol interference (ISI) at the sample point. The output of the Nyquist filter 205 is passed through an adaptive channel equalizer 206. The adaptive channel equalizer 206 is a linear Finite Impulse Response (FIR) filter with adaptive weights. The channel equalizer 206 removes the effects of the distortion caused by the cable channel between the user and the head end. The characteristics of the cable channel are different for each user, so the equalizer weights must be changed for each user. In accordance with the present invention, the outputs of the channel equalizer 206 are passed through a band stop filter bank 207. The band stop filter bank 207 is set to filter out the ingress present. At any time it may have a number of notches in it, each notch is set to remove an interfering signal. The band stop filtering causes distortion in the desired signal, which can seriously degrade the bit error performance. In accordance with the present invention, this distortion is effectively removed by using a non-linear equalizer. The equalizer must be non-linear because a linear equalizer, which restores the missing desired signal components, would have to restore the ingress as well. The non-linear equalizer consists of an inner equalizer 208 and an outer equalizer 209. Aside from the present invention 217, which comprises the band stop filter bank 207, the inner equalizer 208 and the outer equalize 209, FIG. 2 depicts a conventional serial tone cable modem. It is the addition of these three components that make the system ingress tolerant. These components will be described in more detail below. The output of the outer equalizer 209 is convert to binary by a QAM to binary converter 210. The binary data is input to the Forward Error Correction (FEC) decoder 211. In some cases FEC is not used therefor the binary data output 212 is the output of the CMT 106. The modem is controlled by a Digital Signal Processor (DSP) 213 which in turn is controlled by a higher level protocol 216. The DSP 213 also has a spectrum monitor input 215. The spectrum monitor 215 could be implemented by software running on the DSP 213. The spectrum monitor 215 is a requirement of any modem which is compliant with the MCNS specification, also for these modems the spectrum monitor 215 would be available from other resources. The spectrum monitor 215 examinines the frequency spectrum and determines the noise and interference spectrum. The noise and interference spectrum for the channel being used by the cable modem is transferred to the DSP 213. The DSP 213 then uses this information to calculate the optimum parameters for the bandstop filter 207 and the inner and outer equalizers 208 and 209. The DSP 213 also controls the synthesizer 203 and the timing generator 214.

Figure 3:
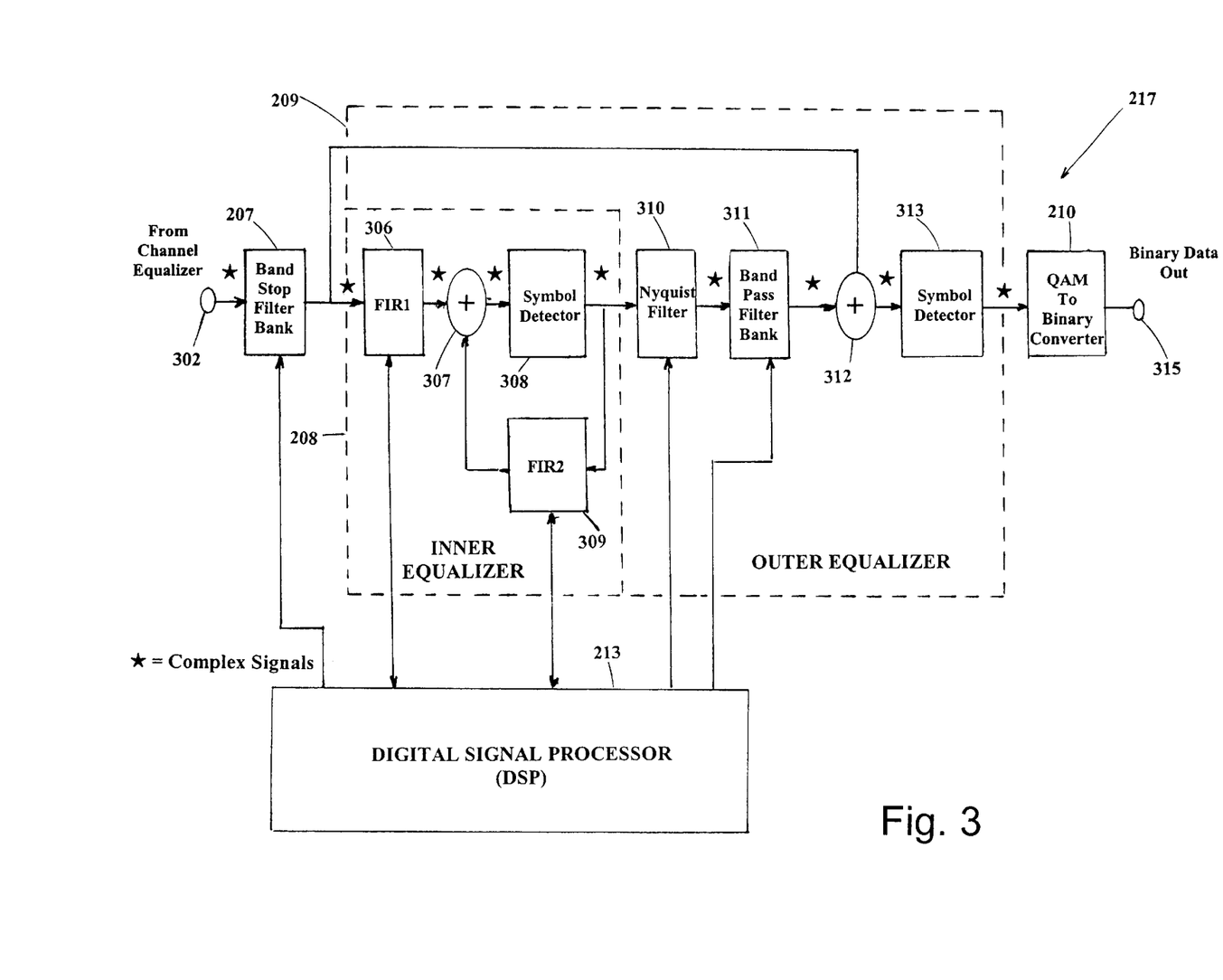
FIG. 3 is a block diagram illustrating in detail the inner and outer equalizers of the present invention.

FIG. 3 shows the present invention in greater detail. The input 302 is the complex received signal after it has passed through the Nyquist filter 205 and the channel equalizer 206. (By complex it is meant that each input sample is a complex number consisting of a real and an imaginary component). The input signal 302 is passed through the band stop filter bank 207. The band stop filter bank 207 is set by the DSP 213 to remove ingress at one or more frequencies. In the process of removing the ingress, the band stop filter 207 distorts the desired signal. The amount of distortion depends on the bandwidth and number of interferers. The characteristics of typical ingress are such that when ingress is present, its bandwidth will be such that the distortion, caused by the band stop filter 207, will be great enough to cause bit errors. The distortion is effectively removed by the inner and outer equalizers 208 and 209.

The inner equalizer 208 consists of two finite impulse response (FIR) filters, a FIR1 306 and a FIR2 309 plus an inner equalizer summer 307, and an inner equalizer QAM symbol detector 308. The function of FIR1 306 is to minimize the inter symbol interference due to symbols that have yet to be detected. The function of FIR2 309 is to remove inter symbol interference from symbols that have been detected. The inner equilizer QAM symbol detector 308 makes a hard decision on the output of the inner equalizer summer 307. The effect of FIR1 306 is to shift the inter symbol interference that occurs before the symbol decision, such that it occurs after the symbol decision. This increases the inter symbol interference that occurs after the symbol decision, and which can be removed by FIR2 309 as long as the decision is correct. When an error occurs it may induce further errors, but this effect has proven, by simulation, to be minor.

The outer equalizer 209 consists of an outer equalizer Nyquist filter 310, a band pass filter bank 311, an outer equalizer summer 312 and an outer equalizer QAM symbol detector 313. The outer equalizer 209 uses the QAM symbols detected by the inner equalizer QAM symbol detecter 308 to form an estimate of the part of the desired signal that is removed by the band stop filter bank 207. The band pass filter bank 311 is the complement of the band stop filter bank 207. This means that:

$$H_{BPF}+H_{BSF}=1$$

Where: $H_{BPF}$=BandPass Filter frequency response $H_{BSF}$=Band StopFilter frequency response Therefore, if the output of the inner equalizer QAM detector 308 is correct, then the output of the band pass filter 311 will be exactly equal to the part of the desired signal that was removed by the band stop filter 207 when the ingress was removed. When this is added to the output of the band stop filter 207, the result is equal to the original signal without ingress. When an error occurs in the inner equalizer QAM detector 308, the estimate of the desired signal distortion will be degraded. However, in most cases the ingress occupies a small fraction of the total signal band and the error rate is small, therefore the portion of the distortion which is not canceled is also very small. The combination of the inner and outer equalizers 208 and 209 provides better performance than just the inner equalizer 208 alone for three reasons. First, the FIR1 306 enhances the noise at the input to the inner equalizer QAM detector 308. When there is no inter symbol interference (ISI), one tap in the FIR1 306 will be unity while all others will be zero, and as the ISI increases, the taps that were zero increase. Since on the average the thermal noise is the same at all delays, the total thermal noise that is applied to the inner equalizer QAM detector 308 increases. Since the outer equalizer 209 does not use the FIR1 306 output, this does not happen in the outer equalizer 209. Second, the number of taps in FIR1 306 and FIR2 309 must be finite because more taps means more cost, and also because it becomes very difficult to compute the optimum weights when the number of taps is very large. This means that there will always be some residual ISI left at the input to the inner equalizer QAM symbol detector 308. The band pass filter 311 can be made such that it is the exact complement of the band stop filter 207, therefore it can exactly cancel the ISI so that the outer equalizer 209 has no residual ISI. Thirdly, the FIR2 309 has tap weights that are larger than the tap weights in the band pass filter 311, so that when errors occur, the effect is less in the outer equalizer 209 than in the inner equalizer 208. When the amount of distortion is small, the inner equalizer 208 can correct it perfectly. In this case the outer equalizer 209 does not improve performance. Also when the distortion is very large, the error rate at the output of the inner equalizer 208 is so poor that the outer equalizer 209 cannot improve matters. Between these extremes the outer equalizer 209 improves performance significantly.

The Band Stop Filter Bank 207 can be set to filter out the ingress. The ingress characteristics are provided to the DSP 213 by the Spectrum monitor 215. Once the ingress is known, a band stop filter bank 207 is formed that reduces the ingress power such that it is less than the thermal noise power. A reasonable objective is to reduce the ingress so that it is 10 dB less than the thermal noise. There are many digital filter design procedures that can be used; a specific method is described later. Generally speaking, filters with more taps will attenuate the ingress more than filters with fewer taps, however, filter with more taps are more difficult to equalize. Therefore, the is a trade-off between the number of taps in the filter, the bandwidth of the filter and the ingress power and bandwidth of the ingress. The band stop filter bank 207 design can be calculated in real time, each time the ingress pattern changes or a family of filters can be pre-calculated and stored. Once the band stop filter is known, the band pass filter bank 311 can be easily calculated since it is simply the complement of the band stop filter bank 207. A specific procedure that can be used to calculate the band stop filter bank 207 is as follows:

A. Determine ingress frequency, bandwidth, and power

B. Specify a band stop filter that has the same center frequency as the ingress but which has 1.5 the bandwidth, then do this for all ingress components. The filter will have a gain of one in the pass band and zero in the stop bands.

C. Take the Inverse Fast Fourier Transform (IFFT) of the band stop filter 7 specified above.

D. Multply the IFFT by a window function. There are many window functions described in the literature. See "Digital Signal Processing: A System Design Approach" by D. J. DeFata, J. G. Lucas, and W. S. Hodgkiss, pages 264–269, 1988, John Wiley and Sons, Inc. The Hanning window is a simple window function that works well. The Qw of a window function is the number of points in it, the window function does not have to be the same size as the FFT, it can be shorter. The higher the Qk, the better the rejection of the filter and the more difficult to equalize. For a given system, the optimum value of Qw is a function of the number of taps in the equalizer and the power in the ingress. Once a system is specified, a table of Qk versus ingress power and bandwidth can be formed by experiment.

E. If the system is implemented in the frequency domain, then the filter design is done once the filter is multiplied by the window. If it is implemented in the time domain, the FFT of the filter must be taken.

The optimum Coefficients for FIR1 306 and FIR2 309 can be calculated once the band stop filter 207 is specified and the number of taps in the FIR1 306 and FIR2 309 are known.

The noise variance at the input to the first symbol detector 308 is:

$$u^2 = \sigma^2 \sum_{n=+N}^{-N} \sum_{m=+N}^{-N} w_n^* h_{n-m} w_m$$

Where: $w_n$ is the coeficients of FIR1 h is the convolution of the band stop filter and the Tx and Rx Nyquist filters

N is the number of taps in FIR1

$\sigma^2$ is the noise power at the input to the matched filter

Written in matrix form this is:

$$u^2 = \sigma^2 \underline{w}' H \underline{w}$$

Where: $\underline{w}$=vector of FIR1 coefficients $H_{nm} = h_{n-m}$

The ISI power can be written as:

$$v^2 = \sum_{i \neq 0} |g_i|^2 = \sum_{i \neq 0} \underline{w}' h_i h_i' \underline{w}$$

Where: $\underline{g} = \underline{w}' \underline{h_i}$ and $\underline{h_i}$=a vector whose $n^{th}$ element is: $h_{i-n}$ We want to find the minimum of the sum of the ISI power and the noise power, subject to the constraint that the gain is unity at delay equal to zero.

The total interference must be minimized:

$$\text{minimize } I = \underline{w}' \left[ \sigma^2 H + \sum_{i \neq 0} h_i h_i' \right] \underline{w} - \lambda \underline{w}' \underline{h_0}$$

Where: $\lambda$ is the La Grange multiplier

The solution to this is:

$$\underline{w} = \lambda \left[ \sigma^2 H \sum_{i \neq 0} h_i h_i' \right]^{-1} \underline{h_0} = \lambda X^{-1} \underline{h_0}$$

and $$\lambda = 2 / \left( \underline{h_0}' X^{-1} \underline{h_0} \right)$$

Therefore, given the Nyquist filter 205 and the band stop filter 207, we can directly calculate the optimum weights for the FIR1 306. The optimum weights for FIR2 309 are just the weights that will cancel the ISI of the band stop filter 207 convolved with FIR2 309.

$$b_i = -\sum_{n=0}^{-N} w_n^* h_{i-n}$$

Where: $b_i$ is a vector of the coefficients of FIR2

Figure 4:
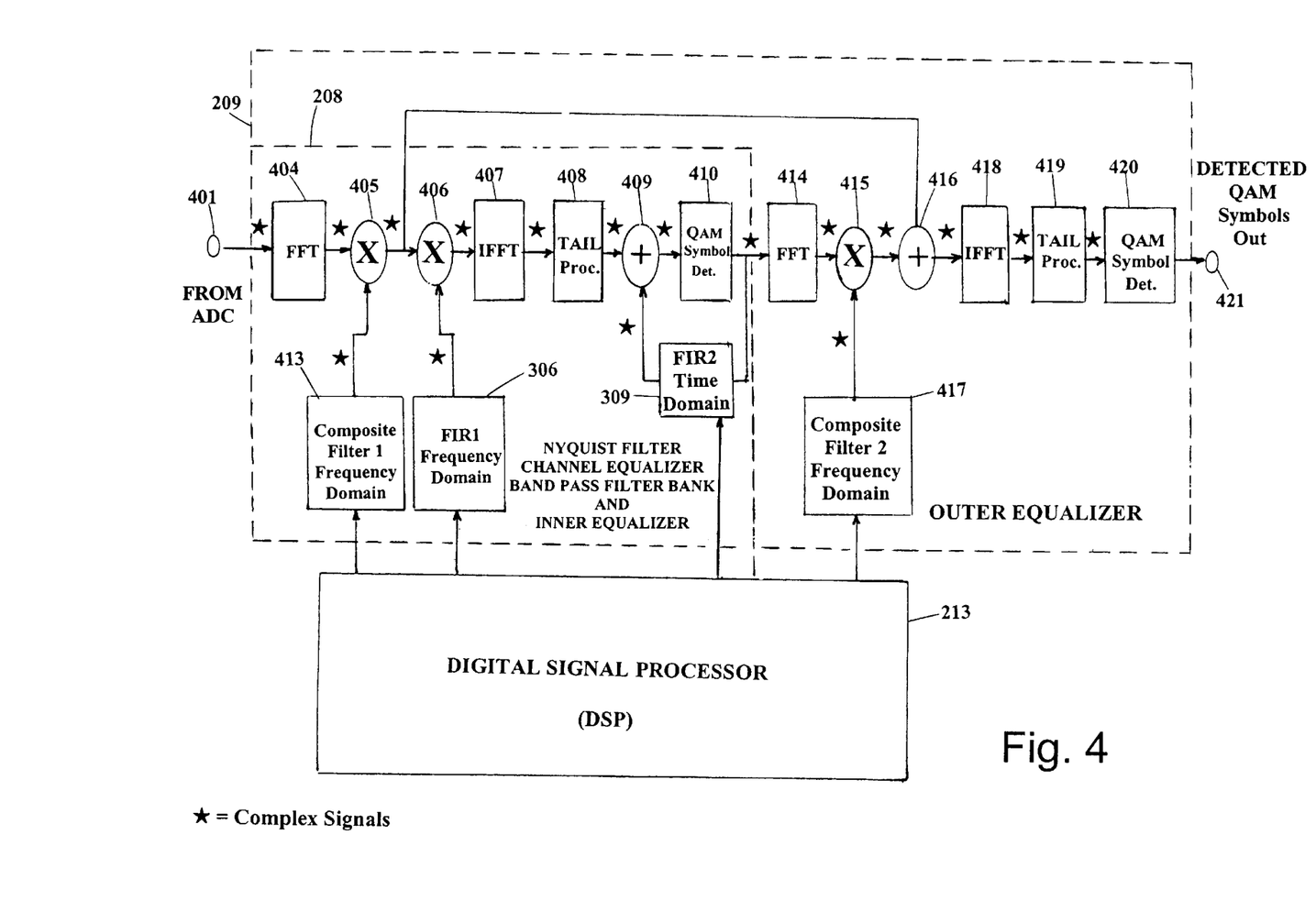
FIG. 4 is a block diagram illustrating the fast convolution implementation of the present invention.

The present invention can be implemented in several ways. The most preferred embodiment is the fast convolution approach, whereby high speed processors such as the TMS320C60 made by Texas Instruments are utilized. FIG. 4 discloses this approach. Here the functions shown in the blocks 402 and 403 would be implemented in one or more high speed processors. The Digital Signal Processor (DSP) 213 would in this case be a more general purpose lower speed DSP.

Figure 5:
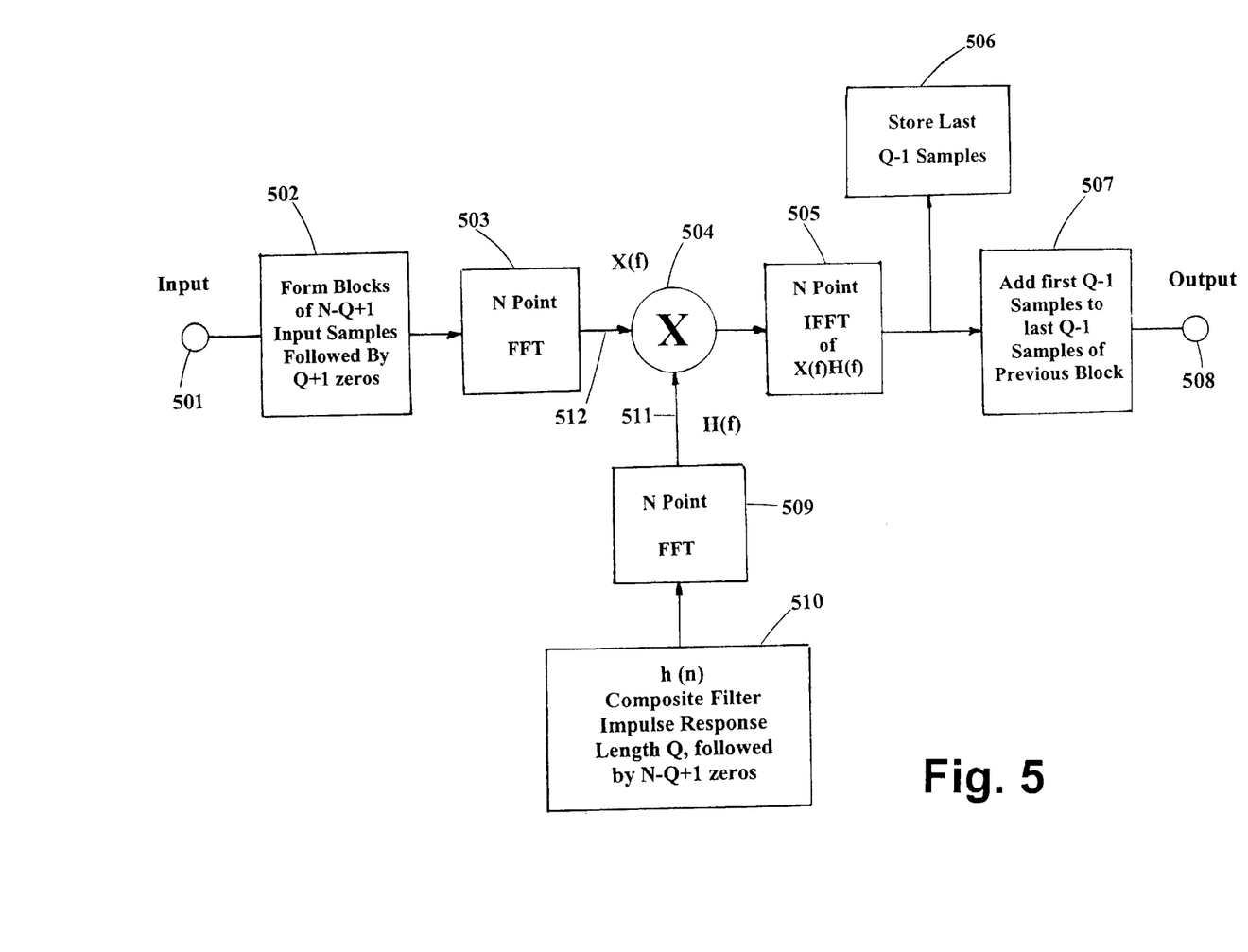
FIG. 5 is a block diagram of how the fast convolution concept is implemented.

Fast convolution is a means of filtering digitally sampled signals. FIG. 5 shows the processing that is required. To implement a filter in the time domain the signal is convolved with the impulse response of the filter 510. In fast convolution, the signal is transformed to the frequency domain by a fast Fourier transform (FFT) 509, then the filtering can be done by simple multiplication 504 instead of convolution. The signal is then transformed back to the time domain by an inverse fast Fourier transform (IFFT) 505. The FFT process 503 operates on blocks of data. The size of the blocks 502 is the size of the FFT which is normally a power of two. In fast convolution the amount of data processed each time an FFT is performed is less than the size of the FFT. This is to allow for the spreading caused by the filter 510. If the size of the FFT is N and the number of samples in the filter impulse is Q, then the number of data samples processed each FFT is N−Q+1. Typically N would be about 4096, Q about 497 so that 3600 signal samples are processed each time an FFT is done. Because of the spreading of the filter some data from each block must be combined with data from the blocks before and after it, this is referred to as tail processing. This technique is described in "Digital Signal Processing: A System Design Approach", pages 311–313, see above.

Referring to FIG. 4, this implementation of the present invention uses fast convolution twice; once in the inner equalizer 208 and once in the outer equalizer 209. The input 401 is the received signal after being converted to baseband and passed through the A/D converters 204. The signal is converted to the frequency domain by an inner equalizer FFT 404. Once in the frequency domain, the signal can be easily filtered so that the functions of the Nyquist filter 205, channel equalizer 206 and the band stop filter 207 can all be done by the first inner equalizer multiplier 405. The inner equalizer composite filter 413 is the product of the FFT of the channel equalizer 206, the Nyquist filter 207, and the band pass filter 311. The inner equalizer composite filter 413 changes very slowly so it can be calculated in the DSP 213. The inner equalizer composite filter 413 stores the composite filter coefficients and output them once each time an FFT is done. The first inner equalizer multiplier 405 performs the complex multiplication of the input and the composite filter coefficients. The output of the first inner equalizer multiplication 405 goes to the outer equalizer 209 and to the second inner equalizer multiplier 406. This second multiplier 406 does the complex multiplication of the output of the first inner equalizer multiplier 405 and the FFT of FIR1 306. The FFT of FIR1 306 also changes slowly, in fact it only changes when the ingress pattern changes and the band stop filter 207 is changed. Therefore the FFT of FIR1 306 is also calculated by the DSP 213 stored in the frequency domain of FIR1 306 and read out once each FFT. After these filtering operations, the signal is converted back to the time domain by the inner equalizer IFFT 407 and the inner equalizer tail processor 408. The output of the inner equalizer tail processor 408 is the same as would have been obtained if all of the filtering operations had been done in the time domain, however the number of multiplications required is much less when done this way. The output of the inner equalizer tail processor 408 goes to the inner equalizer summer 409. The other input to this summer 409 is the output of FIR2 309. The output of the inner equalizer summer 409 goes to the inner equalizer QAM symbol detector 308, whose output is the input to FIR2 309 and the input to the outer equalizer 209. The FIR2 309 can be implemented with fewer taps than the band stop filter 207 so it is implemented in the time domain. The output of the inner equalizer QAM symbol detector 308 goes to an outer equalizer FFT 414. This is multiplied by the outer equalizer composite filter 417 by the outer equalizer complex multiplier 415. The outer equalizer composite filter 417 is the product of the FFT of the outer equalizer Nyquist filter 310 and the FFT of the band pass filter bank 311, which is the complement of the band stop filter bank 207. This signal is an estimate of the part of the desired signal that was removed by the band stop filter bank 207. The signal at the output of the outer equalizer complex multiplier 415 is sent to the outer equalizer summer 416 and summed with the output of the first inner equalizer complex multiplier 405 to form the estimate of the original desired signal with the ingress removed. This signal is passed through the outer equalizer IFFT 418, outer equalizer tail processor 419 and the outer equalizer QAM symbol detector 313 to form the output 421. The DSP 213 performs the same functions shown in FIG. 3 and described above except that in this case the DSP 213 calculates the FFT of the composite filters 413 and 417 and the FIR1 306. The inner equalizer composite filter 413 includes the Nyquist filter 205, channel equalizer 206 and the band stop filter bank 207. The Nyquist filter 205 and the channel equalizer 206 need not be included in this filter if they could be implemented externally. This might be the case where this present invention was added to an existing cable modem to provide protection against ingress.

Figure 6:
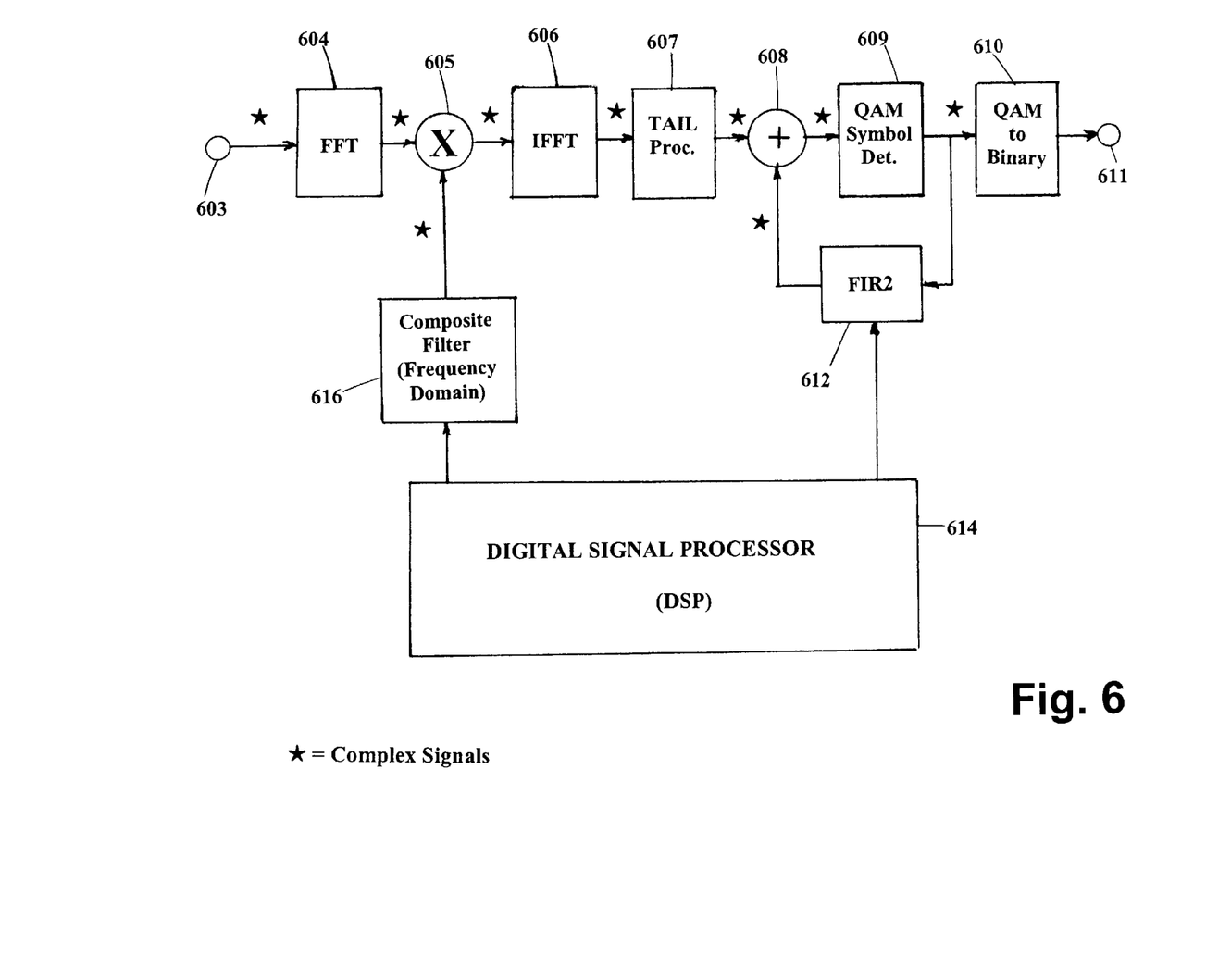
FIG. 6 is a block diagram of the simplified version of the fast convolution implementation when the inner equalizer is use without an outer equalizer.

Another embodiment of the invention is a simplified version of the fast convolution implementation of the preferred invention wherein the outer equalizer is eliminated. This is shown in FIG. 6. This embodiment will reduce cost but will also reduce the performance to some extent and in many cases this reduced cost and complexity may make this implementation very desirable. This is similar to the complete fast convolution approach described above but without the outer equalizer 209. There is also an added simplification in that all of the frequency domain filtering can be done using just a complex multiplier 605 rather than the two used in the preferred embodiment. The input signal 603 is converted to the frequency domain by a fast Fourier transform FFT 604. It is then multiplied by a composite filter 616 by the complex multiplier 605. In this case the composite filter 616 consists of the product of the FFT of the Nyquist filter 205, the FFT of the Channel Equalizer 206, the FFT of the band stop filter bank 207 and the FFT of the FIR1 306. Since there is no outer equalizer 209, there is no need to have access to the output of the band stop filter bank 207 prior to FIR1 306. The output of the complex multiplier 605 is converted back to the time domain by the IFFT 606 and the Tail Processor 607. Next, at the summer 608, the signal is summed with the output of the FIR2 612 and then passed through a QAM Symbol Detector 609. The output of this QAM Symbol Detector 609 goes to the QAM to Binary Converter 610 to form the output 611. The DSP 614 has the same functions as in the previous embodiment except that the outer equalizer controls are not required.

Another application of the present invention relates to removing interference in digital radio communications. Radio channel communications systems often suffer from unwanted interference when the interference is much narrower than the signal in which the interference can be removed by band stop filtering. Digital radio modems exist which use band stop filtering but they do not do non-linear equalization. The usual technique is to do the band stop filtering and then form a matched filter receiver that is matched to the filtered wave form. That approach is better than nothing but does not remove all of the distortion caused by the band stop filter bank 207. The non-linear equalization method described above can be used for radio channels and will provide much more complete removal of the desired signal distortion than will the matched filter approach.

FIG. 2, which is a diagram for a cable system is the same for digital radio channel communications. The only difference is that the input 201 signal is the radio signal at the frequency in which the radio operates at, and the data rate is the radio channel data rate. Also the modulation is not restricted to QAM as it can be any digital modulation. HF radio channels are often subject to narrow band interference for that case where the data rates are much lower than the data rates used in cable systems. In this situation the present invention would be implemented entirely within the DSP 213.

It is to be understood that the present invention is not limited to the sole embodiments described above, but encompass any and all embodiments within the scope of the following claims.

I claim:

1. An interference tolerant modem method for removing ingress at the head end only of a cable modem termination system, the method comprising:
   a complex input signal from the cable system;
   a variable band stop filter bank for accepting the signal from the cable system and filtering out ingress at specified frequencies;
   a non-linear equalizer comprising an inner equalizer and an outer equalizer for removing distortion created by the band stop filter;
   the inner equalizer having:
      a first finite impulse response filter accepting the output of the band stop filter and minimizing the inter symbol interference due to symbols that have yet to be detected;
      a second finite impulse response filter for removing inter symbol interference from symbols that have been detected;
      an inner equalizer summer for combining the output of the finite impulse response filters; and
      an inner equalizer quadrature amplitude modulation symbol detector for making a hard decision on the output of the inner equalizer summer,
         whereby the inter symbol interference, that occurs before the symbol decision, is shifted to occur after the symbol decision, thereby increasing the inter symbol interference that occurs after the symbol decision which can be removed by the second finite impulse response filter;
   an outer equalizer having:
      an outer equalizer Nyquist filter for accepting the quadrature amplitude modulation symbol detected by the inner equalizer to form an estimate of the part of the designed signal that was removed by the band stop filter bank;
      a band pass filter bank, it being a complement of the band stop filter bank such that the output of the band pass filter will be exactly equal to the part of the desired signal that was removed by the band stop filter at the time the ingress was removed, thereby cancelling exactly the inter symbol interference, whereby the outer equalizer will not have any residual inter symbol interference;
      an outer equalizer summer for combining the signal output from the band pass filter bank and the band stop filter bank, the sum being equal to the original signal with ingress removed; and
      an outer equalizer quadrature amplitude modulation symbol detector for passing the output signal from the outer equalizer summer to a quadrature amplitude modulation to binary converter wherein an ingress free binary signal is produced without reducing the data rate or changing the frequency of the signal.

2. The interference tolerant modem method according to claim 1, wherein the variable band stop filter bank comprises a multiplicity of frequency notches for removing ingress at multiple frequency ranges.

3. The interference tolerant modem method according to claim 2, wherein the cable modem termination system includes:
   a spectrum monitor for examining the ingress frequency spectrum of incoming signals and determining the noise and interference spectrum; and
   a digital signal processor which draws data from the spectrum monitor in order to calculate the optimum parameters for the band stop filter bank and provide means for selecting optimum tap weights for the two finite impulse response filters,
      whereby the optimum tap weights for the second finite response filter are exactly the weights that will cancel the inter symbol interference of the band stop filter convoluted with it.

4. The interference tolerant modem method according to claim 3, wherein the spectrum of frequencies in the band stop filter bank, which is set by the digital signal processor, is such the once an ingress is known, a band stop filter bank is formed that effectively eliminates the ingress power.

5. A fast convolution system for implementing an interference tolerant modem method for removing ingress at the head end only of a cable modem termination system, the convolution system comprising:
   a complex signal from the cable system;
   blocks of data for digitally sampled input signals in the time domain;
   an inner equalizer fast Fourier transform for converting blocks of input signals to the frequency domain;
   an inner equalizer composite filter including the products of:
      the fast Fourier transform of a Nyquist filter;
      the fast Fourier transform of a channel equalizer; and
      the fast Fourier transform of a band stop filter, whereby the composite filter changes at a very slow rate;
   a digital signal processor for analyzing the data from a spectrum monitor and calculating the coefficients for the inner equalizer composite filter;
   a first inner equalizer multiplier for performing the complex multiplication of the input signal and the inner equalizer composite filter coeffients, whereby the ingress contained within the input signal from the cable system is removed in the frequency domain;
   a first finite impulse response filter calculated by the digital signal processor;
   a second inner equalizer multiplier for performing the complex multiplication of the outputs of the first inner equalizer multiplier and the fast Fourier transform of the first finite impulse response filter;
   an inverse fast Fourier transform for converting the frequency domain signals for the second inner equalizer multiplier back to the time domain;

an inner equalizer tail processor for combining blocks of data with blocks of data before and after them;

a second finite impulse filter that can be implemented with fewer taps than the band stop filter, thereby allowing it to be implemented in the time domain;

an inner equalizer summer for combining the output signal from the inner equalizer tail processor with the output from the second finite impulse response filter;

an inner equalizer quadrature amplitude modulation symbol detector for accepting the outputs of the inner equalizer summer and the second finite impulse response filter for further fast convolution in the outer equalizer;

an outer equalizer fast Fourier transform for converting the signals exiting the inner equalizer from the time domain to the frequency domain;

an outer equalizer composite filter with coeffients calculated by the digital data processor, the filter being the product of the fast Fourier transform of an outer Nyquist filter and the fast Fourier transform of a band pass filter bank, the band pass filter being the complement of the band stop filter bank;

an outer equalizer multiplier, for multiplying the outputs of the inner equalizer and the outer equalizer composite filter, to form a signal that is an estimate of the part of the desired signal which was removed by the band stop filter bank;

an outer equalizer summer for summing the output of the outer equalizer multiplier with the output of the first inner equalizer multiplier to form the estimate of the original desired signal with the ingress removed;

an outer equalizer inverse fast Fourier transform for converting the exiting signals of the outer equalizer summer from the frequency domain to the time domain, whereby the signal is processed first through an outer equalizer tail processor, then an outer equalizer quadrature amplitude modulation symbol detector before being returned to the system ingress free.

6. An interference tolerant modem method for removing ingress at the head end only of a cable modem termination system, the method comprising:

a complex signal from the cable system;

a variable band stop filter bank for accepting the complex signal and filtering out ingress at specified frequencies; and a non-linear equalizer for removing distortion created by the band stop filter, the equalizer comprising:
  a first finite impulse response filter for accepting the output of the band stop filter bank and minimizing the inter symbol interference due to symbols that have yet to be detected;
  a second finite impulse filter for removing inter symbol interference from symbols that have been detected;
  a summer for combining the output of the two finite impulse response filters; and
  a quadrature amplitude modulation symbol detector for making a hard decision on the output of the summer before sending to a binary converter, whereby an ingress free signal is produced without reducing the data or changing the frequency of the signal.

7. The interference tolerant modem method according to claim 6, wherein the variable band stop filter bank comprises a multiplicity of frequency notches for removing ingress at multiple frequency ranges.

8. The interference tolerant modem method according to claim 7, wherein the cable modem termination system includes:

a spectrum monitor for examining the ingress frequency spectrum of incoming signals and determining the noise and interference spectrum; and a digital signal processor which draws data from the spectrum monitor in order to calculate the optimum parameters for the band stop filter bank and provide means for selecting optimum tap weights for the two finite impulse response filters, whereby the optimum tap weights for the second finite response filter are exactly the weights that will cancel the inter symbol interference of the band stop filter convoluted with it.

9. The interference tolerant modem method according to claim 8, wherein the spectrum of frequencies in the band stop filter bank, which is set by the digital signal processor, is such that once an ingress is known, a band stop filter bank is formed that effectively eliminates the ingress power.

10. The interference tolerant modem method according to claim 9, wherein the method is implemented by a fast convolution system comprising:

blocks formed of input samples from the input signal;

a fast Fourier transform converting the input signal to the frequency domain for filtering;

a first composite filter including the products of:
  a fast Fourier transform of a Nyquist filter;
  a fast Fourier transform of a channel equalizer;
  a fast Fourier transform of the first finite impulse response filter calculated by the digital signal processor; and
  a fast Fourier transform of the variable band stop filter bank;

a multiplier for performing the complex multiplication of the input signal and the first composite filter coefficients, whereby ingress contained within the input signal from the cable system is removed in the frequency domain;

an inverse fast Fourier transform for converting the frequency domain signals for the multiplier output back to the time domain;

a tail processor for accepting the time domain signal from the inverse fast Fourier transform, whereby data from each block is combined with data from blocks before and after it to produce the ingress free output signal; a second finite impulse response filter that can be implemented with fewer taps than the band stop filter, thereby allowing it to be implemented in the time domain;

a summer for combining the output signal from the tail processor with the output from the second finite impulse response filter; and a quadrature amplitude modulation symbol detector, for accepting the outputs of the summer and the second finite response filter, and then forwarding the product to a binary converter wherein an ingress free binary signal is produced.

* * * * *